July 4, 1950

N. J. PETERS 2,514,007

CHEESE PRESS

Filed April 22, 1948

INVENTOR.
Norman J. Peters
BY
Quarles & French
ATTORNEYS

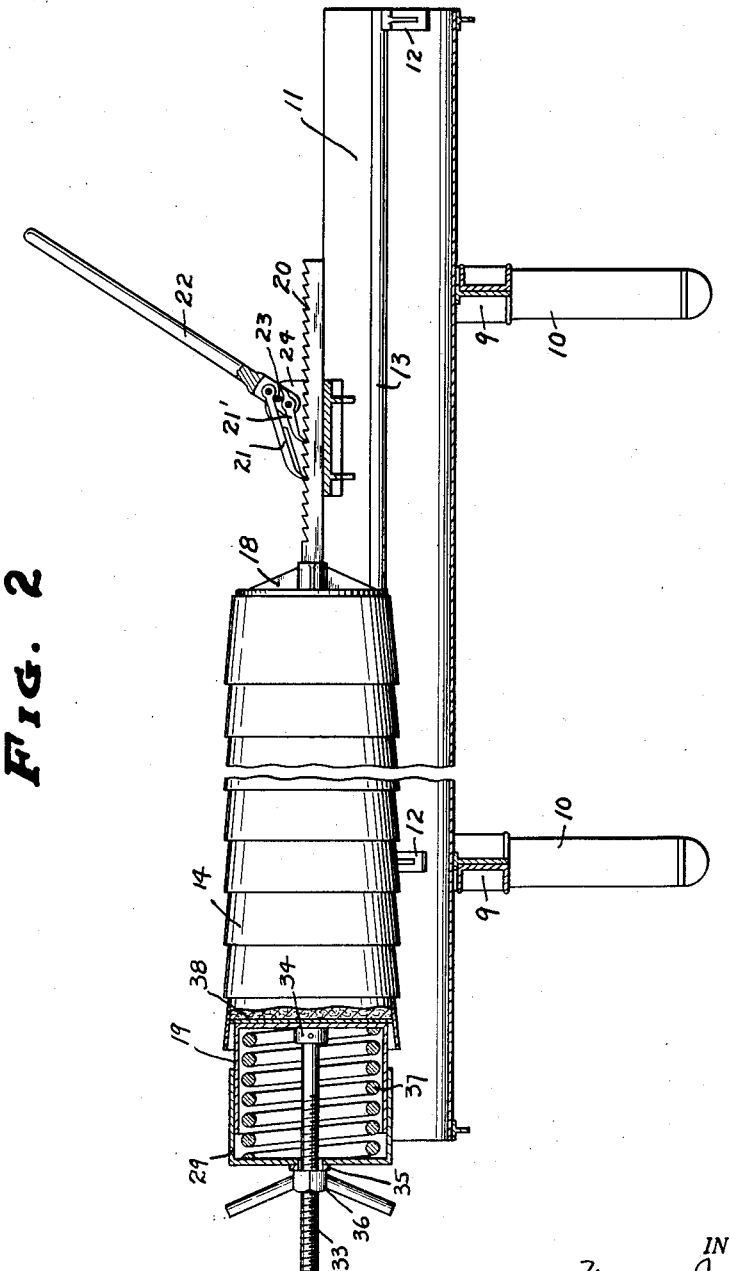

Patented July 4, 1950

2,514,007

UNITED STATES PATENT OFFICE 2,514,007

CHEESE PRESS

Norman J. Peters, Fond du Lac, Wis., assignor to Damrow Brothers Company, Fond du Lac, Wis., a corporation of Wisconsin Application April 22, 1948, Serial No. 22,541

1 Claim. (Cl. 100—55)

The invention relates to cheese presses.

The object of the invention is to provide a cheese press of the general form shown in U. S. Patent No. 2,362,089, of November 7, 1944, to Norman J. Peters, in which a spring pressure producing means has been substituted for the hydraulic cylinder, so that the press can be used where water or air pressure is not available. More particularly, according to the present invention, the pressing head is backed by a heavy spring which may be put under pressure through the operation of the manually controlled rack bar of the press and a safety shaft and nut is associated with the spring which has the following advantages: (1) It will prevent the cylinder from coming apart in the event the cheese molds might raise in the press and buckle therefrom. (2) It will prevent the cylinder from coming apart if the spring should break. (3) It enables the operator to draw up the spring pressure on the safety shaft before releasing the ratchet lever acting against the opposite ends of the assembled hoops. (4) It also enables the easy placing of an additional hoop into the press by first bringing up the ratchet or rack base and pressing, then tightening up the safety nut to compress the spring, and then when the ratchet is again released, there may be room for an additional hoop. This last feature is very important when the press is completely loaded.

The invention further consists in the several features hereinafter described and more particularly defined by claim at the conclusion hereof.

In the drawings:

Fig. 2 is a vertical sectional view taken on the line 2—2 of Fig. 1.

Figure 1:
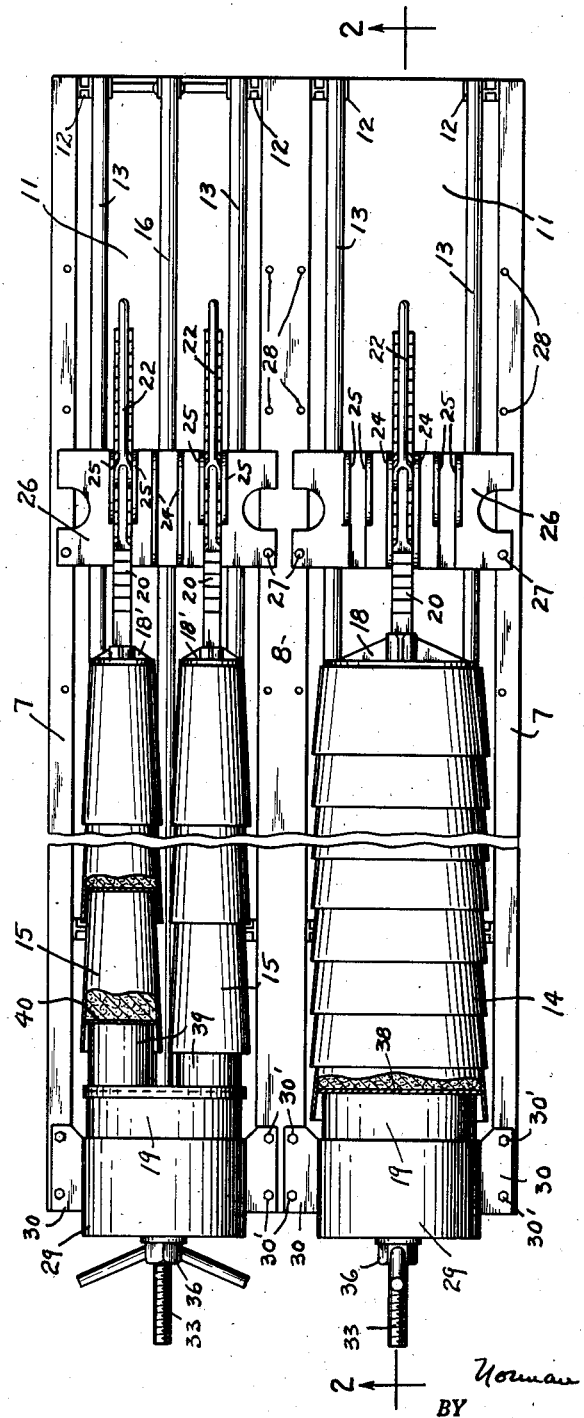
Fig. 1 is a plan view of a cheese press embodying the invention, parts being broken away and parts being shown in section.

The frame of the press is identical with that shown in detail in U. S. Patent No. 2,362,089 and includes metal side beams 7 and a central beam 8, these beams being welded or otherwise fixedly secured to transversely extending metal partitions 9 in which tubular metal legs 10 are secured. Troughs 11 of sheet metal are formed to be supported on the beams 7 and the beam 8 as shown in Fig. 4 of said patent, and sets of brackets 12 are fixedly mounted in each trough at spaced intervals and carry guide rods 13 extending lengthwise of the troughs. These rods act as supports for the cheese hoops 14 in the case of large cheeses and also as one of the supports for the cheese hoops 15 of the smaller cheeses which are also supported by a central rod 16 as shown more in detail in Fig. 4 of said patent.

The cheeses in the cheese hoops are subjected to pressure between a rack moved ram 18 or 18' and a spring backed ram 19. Each row of cheese hoops has its own rack moved ram, but for the smaller cheese a single ram 19 is used for two rows of cheese.

The rams 18 or 18' are each of similar construction and each has a rack operating bar 20 which is alternately engageable by operating and locking pawls 21 and 21', pivotally mounted on an operating lever 22 which is adapted to be detachably secured by a pivot pin 23 to either the spaced support and guide arms 24 or 25 of bracket 26 extending across each trough 11 and adapted to be secured at different distances along the length of the trough by pins 27 and said bracket engageable with any one set of a series of sets of holes 28 in the frame of the apparatus.

Each ram 19 is slidably mounted in a headed cylinder 29 which has anchoring lugs 30 formed integral therewith, and similar to the lugs 32 of said Patent No. 2,362,089 are offset laterally from the axis of said cylinder, so that the axis of said cylinder will occupy different positions relative to the troughs 11 depending upon the size of cheeses being handled. The functioning of these offset lugs 30 to accommodate large and small cheese is shown in detail in Fig. 3 of said patent. The lugs 30 are secured to the frame members 7 and 8 by bolts 30'. The front end of the ram 19 has a threaded shaft 33 secured to a centrally disposed socket 34 welded to said ram, this shaft being what I have termed a safety shaft extending through a bushed opening 35 in the head of cylinder 29 and having a safety wing nut 36 mounted on its threaded portion. A spring 37 is interposed between the head of the ram 19 and the head of the cylinder 29.

With the above construction a series of cheese hoops 15 are mounted in nested relation on the rods 13 between the rams 19 and 18, the ram 19 acting against a follower 38 in the adjacent hoop, the support for the ram 18 having been previously secured in the desired position on the frame members of the press. The operating lever 22 is then swung forwardly from the position shown in Fig. 2 so as to push forwardly or toward the left on the rack bar 20 and the ram 18 acting on the cheese hoops 15 acts to move the ram 19 against the spring 37 to compress the same. Each time the spring 37 is compressed it may be locked against expansion by turning up on the wing nut 36, and the locking of the spring by said nut may also be used to prevent the cylinder from coming apart in the event the cheese molds rise in the press and buckle therefrom, and it also prevents the cylinder coming apart in the event of breakage of the spring 37. During the actual pressing operation, however, the spring 37 is free to act on the ram 19. The nut 36 also enables the operator to draw up the spring 37 through the movement of the shaft 33 when releasing the lever 22. It is unsafe to release this lever without locking as there is a ton or more pressure against the spring 37. The pressure from the ratchet lever is released when the cheese in the hoops is first dressed, and when the hoops are finally taken from the cheese press.

The arrangement also enables the easy placing of an additional hoop into the press by first bringing the ratchet base 26 to the desired position and pressing by moving the ram 18 forwardly and compressing the spring 37, then the safety nut 36 can be tightened to compress the spring 37, and then when the ratchet lever 22 is released, there may be room left for an additional hoop which may be inserted before actual pressing is commenced. This is important when the press is completely loaded.

The same action takes place when pressing smaller cheese, the only difference being that instead of one large ratchet operated ram 18, two smaller ratchet operated rams 18' are used acting in conjunction with a single spring backed ram 19, the ram in this instance having spaced heads 39 adapted to enter the smaller cheese hoops and engage the followers 40 therein.

Thus in each instance the cheese in the hoops is pressed between the spring backed ram 19 and the ratchet operated ram 18 or 18', and the action of the spring is controlled by the shaft 33 and the nut 36 mounted thereon.

I desire it to be understood that this invention is not to be limited to any particular form or arrangement of parts except in so far as such limitations are included in the claim.

What I claim as my invention is:

In a cheese press, the combination with a frame provided with cheese hoop supports, pressing rams mounted on said frame between which the loaded cheese hoops are pressed, one of said rams being manually movable, a headed cylinder in which the other ram is slidably mounted, a spring interposed between said cylinder and ram, a threaded shaft secured to said ram and slidably mounted in the head of said cylinder, and a manually turnable stop nut mounted on said shaft and bearing against the outside of the head of said cylinder for controlling the action of said spring.

NORMAN J. PETERS.

REFERENCES CITED

The following references are of record in the file of this patent:

UNITED STATES PATENTS

| Number | Name | Date |
| --- | --- | --- |
| 256,904 | Laas | Apr. 25, 1882 |
| 640,441 | Bradley | Jan. 2, 1900 |
| 1,239,652 | Wickham | Sept. 11, 1917 |
| 2,362,089 | Peters | Nov. 7, 1944 |